(12) United States Patent
Eichin et al.

(10) Patent No.: US 7,162,214 B2
(45) Date of Patent: Jan. 9, 2007

(54) ENERGY-SAVING METHOD FOR THE WIRELESS RECEPTION OF DATA MODULATED ON A CARRIER SIGNAL

(75) Inventors: Matthias Eichin, Heilbronn (DE); Thomas Mistele, Ilsfeld (DE)

(73) Assignee: Vishay Semiconductor GmbH, Heilbronn (DE)

( * ) Notice: Subject to any disclaimer, the term of this patent is extended or adjusted under 35 U.S.C. 154(b) by 1134 days.

(21) Appl. No.: 10/053,403

(22) Filed: Nov. 2, 2001

(65) Prior Publication Data

US 2002/0081991 A1    Jun. 27, 2002

(30) Foreign Application Priority Data

Nov. 3, 2000 (DE) ................. 100 54 529

(51) Int. Cl.
*H01Q 11/12* (2006.01)

(52) U.S. Cl. ............... 455/127.5; 455/127.2; 455/183.2

(58) Field of Classification Search ............. 455/127.2, 455/67.3, 127.5, 260, 183.1, 183.2; 370/343, 370/344; 375/377; 340/7.36, 7.38, 7.41; 320/311

See application file for complete search history.

(56) References Cited

U.S. PATENT DOCUMENTS 5,806,006 A    9/1998  Dinkins
5,924,017 A    7/1999  Pinter et al.
6,282,415 B1   8/2001  Buhler et al.

FOREIGN PATENT DOCUMENTS

| DE | 19732675 | 4/1999 |
|---|---|---|
| DE | 19809905 | 9/1999 |
| DE | 19833613 | 1/2000 |
| DE | 19904878 | 8/2000 |
| EP | 0663733 | 7/1995 |
| JP | 355085150 A * | 6/1980 |
| WO | WO 98/01994 | 1/1998 |

* cited by examiner

Primary Examiner—Melur Ramakrishnaiah
(74) Attorney, Agent, or Firm—W. F. Fasse; W. G. Fasse (57) ABSTRACT

An energy-saving method for wireless reception of data modulated on a carrier signal is carried out in a receiver circuit including a first group and a second group of circuit elements. The first group of the circuit elements required for recovering the data from the modulated carrier signal are supplied intermittently with electrical energy, while the remaining circuit elements of the second group are supplied with uninterrupted electrical energy. After an intermittent unpowered phase without electrical energy being supplied to the first group of circuit elements, the receiver can be operated in the next intermittent powered phase of the second group of circuit elements with parameters that determined the receiver properties which were present in the last reception phase and that have been stored, thus eliminating the time required for renewed tuning in.

12 Claims, 3 Drawing Sheets

ENERGY-SAVING METHOD FOR THE WIRELESS RECEPTION OF DATA MODULATED ON A CARRIER SIGNAL

BACKGROUND OF THE INVENTION

The present invention relates to an energy-saving method for the wireless reception of data modulated on a carrier signal.

A known, integrated receiver circuit for such an infrared remote control receiver, which has a digital gain control, is the T2521B circuit from the company ATMEL Germany GmbH. The principle of operation of such a circuit is that the carrier modulated signal—the received signal—received from a photodetector, as a rule a photodiode, is fed into an input circuit. The input circuit has a transimpedance amplifier which amplifies the pulsed input current signals and converts them into voltage signals. These voltage signals are then processed in a signal conditioning means. The signal conditioning means has a control amplifier, a limiter and a bandpass filter. In this connection, the task of the control amplifier is to amplify the output voltage from the transimpedance amplifier in accordance with the control specification. The task of the limiter is to limit the signal level swing in order to avoid overmodulation of the bandpass filter. The bandpass filter enables selectivity of the receiver and limits its bandwidth. The signals at the output of the bandpass filter are evaluated in a demodulator as an evaluation circuit. This demodulator consists of comparators, an integrator and Schmitt-trigger and generates a switching signal for a driver transistor functioning as a switch, as a result of which a digital control signal is made available to a microcontroller, for example, for further processing.

This known circuit also contains a digital gain control, through which the gain of the receiver is tuned according to an interference field, by means of which high sensitivity for the received signals is attained, however at the same time interference factors, which could arise from an external light for example, are substantially suppressed.

Such a known circuit for infrared remote control receivers has, as a rule, a current consumption from 1 mA to several mA. This means that, with battery driven receivers, an adequate battery service life of around one year is not given in the case of permanent readiness to receive.

An attempt is therefore made to realize energy-saving operation with lower average current consumption by means of externally cycling the supply voltage, and thus increasing the service life of the batteries to more than one year. Such a method for operating an infrared receiver is known from EP 0 663 733 A1, in which this infrared receiver is connected via an interval switch to a battery-fed circuit for the supply voltage, and Via this cyclically supplied with electrical energy. The intermittent operation is suspended, in that the receiver circuit is linked to the supply voltage, by a start signal, the duration of which exceeds the duration of the switching intervals of the interval switch. As a result, the receiver becomes ready to receive by means of a power-on reset (POR) and remains uninterruptedly linked to the supply voltage for at least the sending time of the control signal transmission following the start signal. In so doing, the amplifier stage of the receiver is set to about half of the maximum sensitivity. As the control for remote control receivers preferably works in the 100 millisecond range, the sensitivity to optical useful signals may be less by a factor of 2 directly after start up. If the interference environment here is, on the one hand, too great, so that the amplifier setting is too high for this environment after the POR, the correct reception of useful signals is only possible with an increased bit error rate. On the other hand, the maximum sensitivity cannot be attained in an interference-free environment. Moreover, the maximum response time to a remote control command should not exceed 200 ms. This period of time corresponds to the interval period during which this receiver is in operation. A maximum "on time" of 1 ms must be maintained in order to reduce the average current consumption to, for example, 5 µA. This known receiver operated in this manner may well have a sufficiently low current consumption, however the settings which determine the properties of the receiver or the gain properties are lost because of the cyclical disconnection of the source of energy, as a result of which the receiver has to work with the starting state again, which may have either a less sensitive, i.e. a reduced range, or a too sensitive setting, i.e. an increased bit error rate. The area of application of such a receiver is thus severely limited.

SUMMARY OF THE INVENTION

The object of the invention is to provide an energy-saving method for operating such a receiver circuit which avoids the above-mentioned disadvantages—that is which leads to the same receiver properties which correspond to those of receivers which are in continuous operation—and with which a substantially reduced current consumption is nevertheless achieved.

According to the invention, an energy-saving method is provided for the wireless reception of data modulated on a carrier signal by means of a receiver circuit including a first group and a second group of circuit elements, in which the first group of circuit elements provided for recovering the data from the carrier signal $S_{in}$ is supplied intermittently with electrical energy, while the second group of circuit elements is supplied uninterruptedly with electrical energy.

After this, the receiver circuit in intermittent operation is not completely disconnected from the operating voltage source, but only the relevant circuit elements of the receiver, namely those which recover the data from the carrier signal, that is the input stage, amplifier stages, band filter and demodulator in particular On the other hand, those circuit elements which, for example, adapt the amplifier settings to the environment are uninterruptedly supplied with electrical energy, and as a consequence of the continuous supply of the operating voltage this information is not lost, so that, upon a renewed start up, work may continue with these parameters in the energy supply phase of the intermittent operation of the receiver without needing time for renewed tuning in to the optimal gain properties. A substantial reduction of the current consumption can be achieved by means of this intermittent operation with the same performance as comparable, known receivers operated in continuous reception operation, as a result of which, with a reduction of the current from 1 mA to 15 µA for example, battery driven applications can easily be realized.

According to an advantageous development of the invention, these amplifier settings can be stored during the energy-free switched phase of the intermittent operation in order to be immediately available in a subsequent ready to receive phase of the receiver which is now supplied with energy again.

In order to bring the receiver safely out of the energy-free switched phase of the intermittent operation, hereinafter referred to as shut down mode, into the state in which the operating voltage is supplied, hereinafter referred to as wake up mode, it is advantageous to generate a start signal for the receiver, the duration of which signal exceeds the duration of the shut down mode, and this state is to be maintained until no further carrier signal is received on expiry of a defined waiting time after the reception of a modulated carrier signal. The intermittent operation is preferably resumed after the expiry of this waiting time.

The wake up and shut down modes can run automatically in an advantageous manner by means of the charging and discharging processes of an electrical storage element, preferably by means of a capacitor. In wake up mode, an incoming data signal is automatically detected and the receiver (i.e. the first group of circuit elements) remains in wake up mode, that is ready to receive. After processing the received signals and a renewed waiting time, the first group of circuit elements changes back into shut down mode. The size of the electrical storage element, that is the size of a capacitor for example, enables the pulse duty ratio of the intermittent operation to be freely selected, so that shut down phases of various lengths can be set which determine the duration of the start signal (pre-burst). Consequently, it is possible to weight the average current consumption in respect of the response time appropriately for the desired application. A unidirectional link to the microprocessor is sufficient as this method works autonomously by means of the storage element.

Moreover, with the use of the storage element, preferably the capacitor, the timing of the wake up and shut down modes is realized by means of a comparator, in that the state of charge at the storage element is compared with a settable reference value, and the first group of circuit elements of the receiver is supplied with electrical energy or switched energy-free as a function of a <-relation or>-relation between these two values.

According to a further, advantageous development of the invention, a first and a second charging and discharging circuit are provided for realizing the recharging processes, in which a charging current source of the second charging and discharging circuit charges the discharged storage element, preferably the capacitors after it has discharged to below the reference value, until the reference value has been exceeded for a defined period of time. The duration of the shut down mode is determined by the storage capacity of this storage element and the size of the reference value.

However, if a carrier modulated signal is available when the reference value if exceeded, that is when the receiver has been "woken up", this signal is detected and the charging process is continued up to a maximum value by means of a charging current source of the first charging and discharging circuit, that is the receiver continues to remain ready to receive. The discharge by means of a discharge current source of the second charging and discharging circuit does not begin until the carrier modulated signal has ended, and continues until either a new signal is received or the value of the charging voltage at the storage element has fallen below the reference value.

When the receiver circuit is realized as an integrated circuit, the storage element, preferably a capacitor as an external component, is connected to a pin of the enclosure. If an enclosure containing this circuit does not have such a pin, the wake up and shut down cycle can also be realized via a bi-directional output connector of the receiver and controlled from the microprocessor. In this case, suitable software takes over the task of changing the operating modes.

BRIEF DESCRIPTION OF THE DRAWINGS

The method according to the invention is described in the following by means of an embodiment in conjunction with the drawings. They show.

DESCRIPTION OF THE PREFERRED EMBODIMENTS

Figure 1:
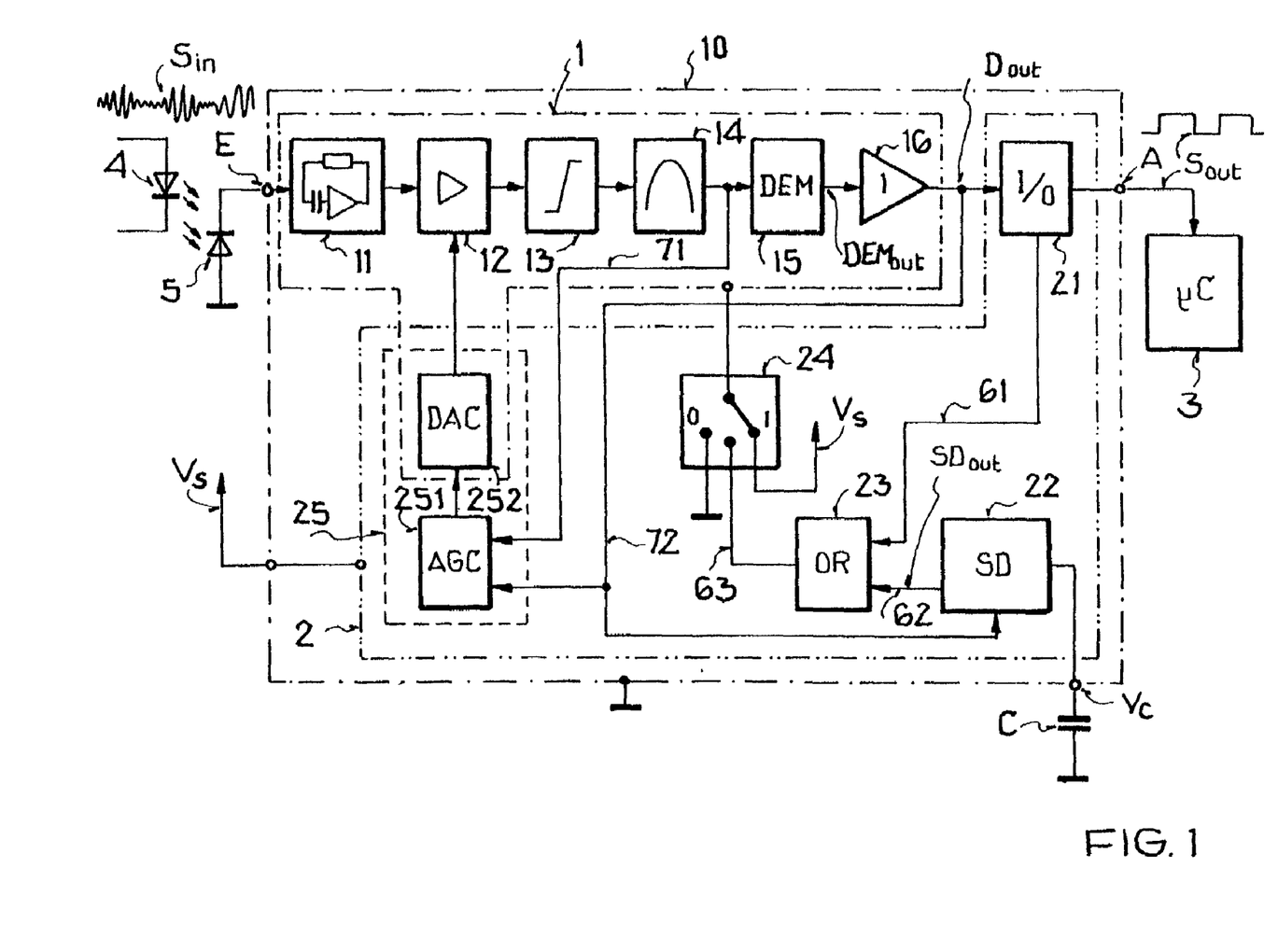
FIG. 1: a block diagram of a receiver circuit according to the invention with a shut-down circuit, FIG. 2; a block diagram of a shut-down circuit used in the receiver circuit according to FIG. 1, and FIG. 3: a logic diagram to illustrate the principle of operation of the shutdown circuit according to FIG. 2.

FIG. 1 shows a block diagram of a receiver circuit 10 and its environment. The carrier modulated data emitted by an optical sender diode 4 is received by a photodiode 5 as infrared pulse packets. These infrared pulse packets striking the photodiode 5 with a carrier frequency of 38 kHz for example are converted into electrical current signals $S_{IN}$. They are available at the input connector E of the receiver circuit 10 These electrical current signals SIN are fed to an input circuit 11 working as a transimpedance amplifier which amplifies the current signals $S_{IN}$ and converts them into voltage signals. In the following signal processing component, these voltage signals are amplified by a control amplifier 12, limited by a limiter 13, and then filtered in a bandpass filter 14.

The signal limitation by means of the limiter 13 is required in order to avoid an overmodulation of the following bandpass filter 14 and to suppress pulse-shaped interference entering the receiver via a supply connector $V_s$ for example. The band-pass filtered signal is demodulated in a demodulator 15 following the bandpass filter 14, buffered in an amplifier 16 (with gain factor 1), and made available, via an input- and output circuit (I/O) 21, at an output connector A as an output signal $S_{out}$ to a microcontroller 3 for further processing In order to optimize the amplification of the useful signal emitted by the sender diode 4 and thus the sensitivity of the receiver, the receiver circuit 10 has a control circuit 25 which feeds the control signals to the control amplifier 12, and which for its part receives, as input signals, the output signal of the bandpass filter 14 via a line 71 and the output signal $D_{out}$ generated by the demodulator 15 and the amplifier 16 via a line 72. The task of this control circuit 25 is to optimize the signal/noise ratio by changing the gain of the input signal SIN as a function of the magnitude of the input signal. The control circuit 25 is constructed from an AGC (251) and a digital-analog-converter (DAG) 252. The AGC 251 separates the useful signals from the interference signals and sets the gain for the useful signals to a highest possible level, so that, on the one hand, a high sensitivity is attained for the useful signals and, on the other hand, interference, from an external light for example, is reduced The digital-analog-converter 252 converts the digital amplifier information generated by the AGC 251 into an analog control voltage for the control amplifier 12.

The circuit elements for recovering the data through which the input signal SIN passes, that is the input circuit 11, the limiter 12, the bandpass filter 14, the demodulator 15 and the amplifier 16 form, together with the digital-analog-converter 252, a first group 1 of circuit elements of the receiver circuit 10, and are connected to an operating voltage source $V_s$ via a changeover switch 24 controlled by a circuit element (SD) 22 and an OR logic gate 23. On the other hand, the last-mentioned circuit elements 22, 23 and 24, and also the AGC 251 and the input- and output circuit 21 are connected directly to the operating voltage source $V_s$ and form a second group 2 of circuit elements of the receiver circuit 10.

In order to implement intermittent operation of the readiness to receive, the complete receiver circuit 10 is not cyclically disconnected from the operating voltage source $V_s$—as in the state of the art—but only the first group 1 of circuit elements, which are considered as significant for the current consumption, in that the circuit elements of the first group 1 are intermittently connected to the operating voltage source VS via the changeover switch 24. In this manner, digital information, such as the control setting adapted to the environment, that is the gain adjustment in particular, can be stored in the control circuit 25 without effecting high current consumption. This is achieved by realizing the AGC 251 in a MOS technology so that the relevant circuit elements are operated non-cyclically by maintaining the supply voltage. On restarting, that is in wake up mode, the control amplifier 12 can work with these stored values immediately, which is why the receiver circuit 10 does not need any time to tune in to the environmental conditions, but can work immediately with the optimal amplifier setting.

The intermittent operation is realized as automatic wake up and shut down modes by means of a capacitor C externally connected to the receiver circuit 10, by determining the timing via charging and discharging processes controlled by the shut down circuit component, hereinafter referred to as SD circuit 22. With the capacity of the external capacitor C, the pulse duty ratio of the intermittent operation can be freely chosen, and can thus be set to shut down periods of various lengths, which determine the duration of a start signal which must exceed the interval time of the shut down in order to ensure that the receiver circuit can change into wake up mode.

The SD circuit 22 takes over the evaluation of the state of charge, that is the charging voltage $V_C$ of the capacitor C, and correspondingly controls the changeover switch 24 via the OR logic gate 23, as described below in connection with the explanation of the pulse diagrams of FIG. 3. The OR logic gate 23 and a connecting line 61 to the input and output circuit 21 can be dispensed with if the intermittent operation is performed exclusively by means of the capacitor C and the SD circuit 22. On the other hand, if it is not possible to connect a capacitor C because of the lack of a connecting pin on the enclosure containing the receiver circuit, the wake up and shut down modes are realized by means of the microprocessor 3, in that this generates the appropriate control commands which are fed to the change-over switch 24 via the input and output circuit 21, the line 61 and the OR logic gate. However, in order to do this, a bi-directional data link is required between the input and output circuit 21 and the microprocessor 3. In this case, a software program in the microprocessor 3 takes over the generation of the appropriate control commands for the changeover switch 24.

The realization of the automatic shut down cycle is described in the following with the aid of the block diagram of an SD circuit 22 according to FIG. 2 in connection with the pulse diagrams according to FIG. 3

Figure 2:
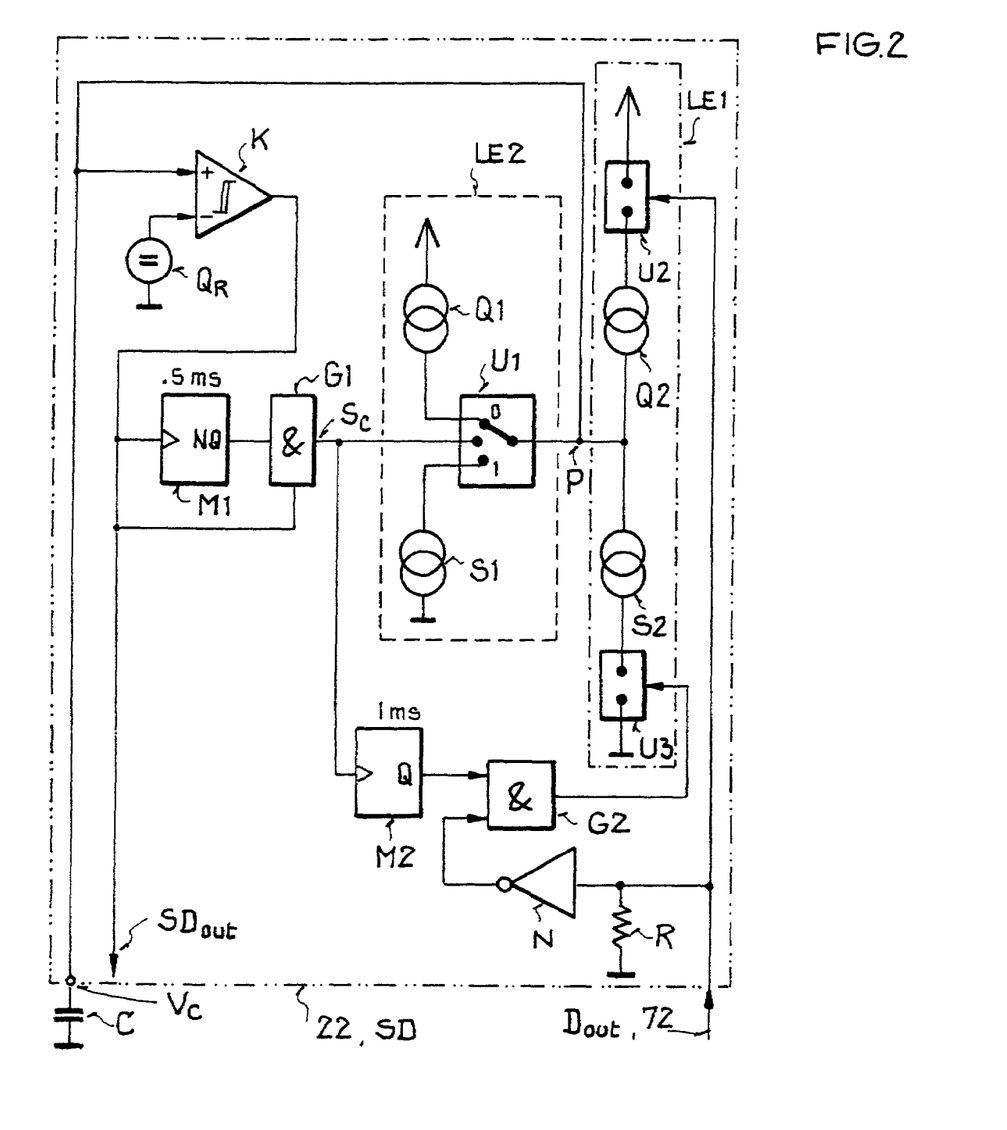

According to FIG. 2, the capacitor C is charged and discharged via a node P by a first charging and discharging circuit LE1 and a second charging and discharging circuit LE2 by means of charging current sources Q2 and Q1 and discharging current sources S2 and S1. The state of charge, that is the charging voltage $V_C$ at capacitor C, is evaluated by a comparator K, whereby the charging voltage $V_c$ is available at its non-inverting input and a reference voltage $V_s/2$ generated by a reference voltage source $Q_R$ is available at its inverting input. A t-$V_C$ pulse diagram according to FIG. 3 shows an exemplary course of the charging voltage $V_C$. If the reference value $V_s/2$ is exceeded by the charging voltage $V_C$ at a time $t_0$, the receiver, that is the circuit elements of the first group 1, is "woken up" by the output of the comparator K, which executes a hysteresis of 100 mV for example, switching to high level, which is available as output signal SDout of the SD circuit 22 and is shown as the t-$SD_{out}$ pulse diagram in FIG. 3. This output signal $SD_{out}$ is fed to a monoflop M1 (where the holding time is 0.5 ms), the inverting output NQ of which is connected to a first input of an AND logic gate G1. The output signal $SD_{out}$ is fed directly to the second input of this AND logic gate G1, so that a control signal $S_C$ is generated at its output—as shown in the t-$S_C$ pulse diagram according to FIG. 3—that serves to control the first charging and discharging circuit LE1 via a further monoflop M2 (holding time is 0.1 ms) and a further AND logic gate G2 downstream of this, and to control the second charging and discharging circuit LE2 via a changeover switch U1. The charging and discharging current source Q2 and S2 of the first charging and discharging circuit LE1 are activated via separate switches U2 and U3 respectively, their switch positions are shown as the t-U2/U3 pulse diagram in FIG. 3. To control the switch U2, the output signal $D_{out}$ of the demodulator 15 is fed directly to this switch U2, while the output signal of the AND logic gate G2 serves to control the switch U3. The output signal $D_{out}$ of the amplifier 16, which is inverted by a NOT logic gate N, is available at the second input of the AND logic gate G2 and simply buffers the actual demodulator output signal $DEM_{out}$. The potential of the demodulator output signal $D_{out}$ is held to low level in shut down mode by means of a high-impedance resistor R connected to ground of the receiver circuit 10.

Figure 3:
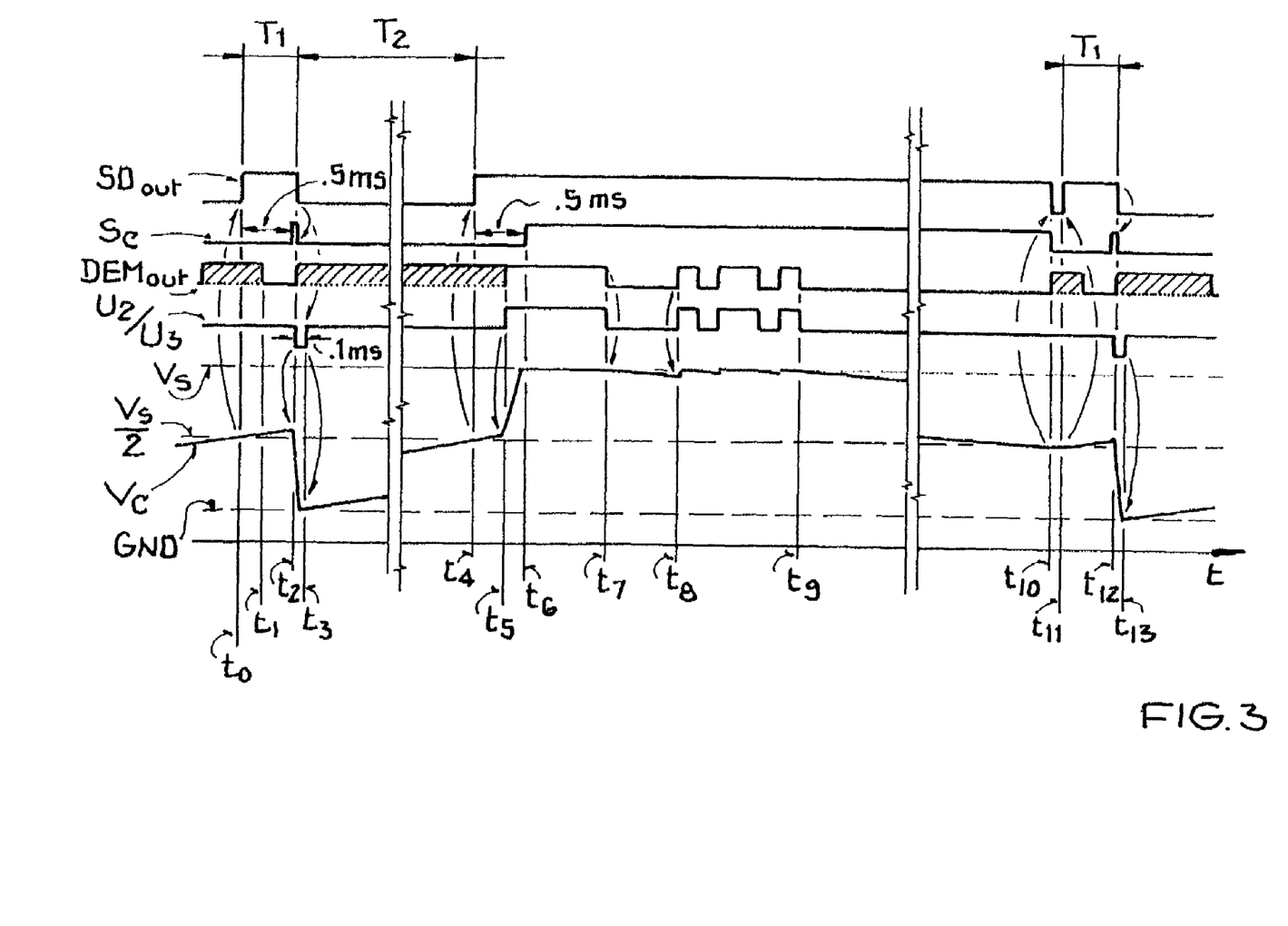

As mentioned above in respect of the t-$V_C$ pulse diagram according to FIG. 3, the charging voltage $V_C$ reaches the reference voltage $V_s/2$ at time to, as a result of which the output signal $SD_{out}$ assumes its high level, upon which the changeover switch 24 (see FIG. 1) connects group 1 of the circuit elements to the supply voltage Vs. However this does not lead immediately to readiness to receive, that is the receiver circuit 10 does not 10 go into wake up mode until after a short transient time, namely at time $t_1$. After the holding time of 0.5 ms at the monoflop M1 has expired, the AND logic gate G1 generates a change to high level, as a result of which the changeover switch U1 connects the node P to the discharge current source S1 and at the same time the output of the monoflop M2 remains at high level for 0.1 ms, so that the NOT logic gate N also changes to high level because of the lack of a signal $D_{out}$ upon which the AND logic gate G2 also generates a high level, which makes switch U3 close, so that the discharge current source S2 becomes active for the defined time of 0.1 ms. The discharge causes the charging voltage to fall below the reference voltage $V_s/2$ at time $t_2$, as a result of which the output signal $SD_{out}$ of the comparator K first falls to low level, and consequently, on the one hand, the wake up mode is ended and, on the other hand, the control signal $S_C$ changes to low level and at the same time the changeover switch U1 reconnects the charging current source $Q_1$ to the node P. However, as its charging current of, for example, 100 nA is orders of magnitude less than the discharge current of the discharge current source S2 of, for example 150 µA, the discharging process is hardly influenced until the capacitor C is fully discharged at time t3. The charging process from time $t_0$ to $t_2$ determines the duration $T_1$ of the high level of the signal $SD_{out}$ and thus the duration of the phase of the wake up mode if no signal is received during this phase.

Hatched pulse trains are shown in the t-$DEM_{out}$ pulse diagram according to FIG. 3, which indicate those time intervals for which the demodulator 15 does not generate any defined output signal $DEM_{out}$, while the other pulse trains, as high and low levels, indicate a data transmission with defined output signal $DEM_{out}$ while the receiver circuit is ready to receive.

The buffer circuit 16 generates a defined output signal $Dot_{out}$ from this at all times.

As the discharging process is ended at time $t_3$ by means of the discharge current source S2, the capacitor C is charged by the charging current source Q1 which has already been switched in since time $t_2$. Should the charging voltage at capacitor C once more attain the reference value $V_s/2$ at time $t_4$, then a rising flank of the output signal $SD_{pout}$, which effects the supply voltage of the circuit group 1—that is the beginning of the next wake up phase, is generated again. The shut down mode, which began at time $t_2$, ends at this time $t_4$, its duration $T_2$ is given by formula:

$$T_2=((C \cdot V_s/2)/I_{Q2})+0.1$$

in which C is the capacity of the external capacitor, $I_{Q2}$ the charging current of the charging current source Q1, and $V_s/2$ the defined reference value.

The charging process continuing at time $t_4$, is continued until time $t_5$, at which point the receiver circuit is ready to receive again after a transient phase. As a high level of the signal $D_{out}$ is now available at this time $t_5$ because of a received signal, not only charging current source Q1 but also charging current source Q2 charge the capacitor C up to the maximal charging voltage Vs via the switched in switch U2.

A rising flank of the control signal $S_C$ is generated at time $t_6$ because of the holding time of 0.5 ms of the monoflop M1, which only effects a switchover from charging current source Q1 to discharge current source S1 by means of the changeover switch U1. The capacitor C is nevertheless held at the maximum charging voltage $V_S$ because the discharge current of, for example 50 nA, of the discharge current source S1 is orders of magnitude lower than the charging current of, for example, 75 µA of the charging current source Q2.

The received data signal is processed by the receiver circuit subsequently to time $t_5$, whereby a falling flank of the signal $DEM_{out}$, and thus also of the signal $D_{out}$, effects an opening of the switch U2 to end the charging process at time $t_7$ for example, and, because of the high-level of the control signal $S_C$, a discharge of the capacitor C by means of the discharge current source S1 of the second charging and discharging circuit LE2 continues until the charging current source Q2 is switched in again by the next rising flank of the signal $DEM_{out}$, at time $t_8$ for example, and as a result of which the capacitor C is charged—to a maximum of $V_S$—for the duration of the high level.

After a data signal has ended, at time $t_9$ for example, discharging takes place to below the reference value $V_s/2$, which is reached at time $t_{10}$. In this case, the discharge period is about $2T_2$, that is double the duration of the shut down phase, because the current strength of the discharging current source S1 is 50% of the current strength of the charging current source Q1. This therefore means that, in the case of a data transmission during a time interval $2T_2$, a flank change switches the charging current source Q2 in or cut, and if there is no data transmission at the end of this time interval $2T_2$, the falling flank of the $SD_{out}$ signal causes the circuit group 1 to be separated from the supply voltage, as for example at time $t_{1C}$, that is the receiver circuit changes into shut down mode again. As a consequence of this, the control signal $S_C$ also falls to low-level, as a result of which the changeover switch U1 connects the charging current source Q1 to the node P. The charging process effected in this manner leads to reference value $V_S/2$ being attained, at time $t_{11}$, and thus again to the generation of a high level of the $SD_{out}$ signal, and as a consequence of this into the wake up mode, which is ended at time $T_{12}$ because there is no data signal—that is after the expiry of the wake up phase $T_1$. A process corresponding to times $t_2$ and $t_3$ now begins again, in which the times $t_{12}$ and $t_{13}$ correspond to the times $t_2$ and $t_3$.

What is claimed is:

1. Energy-saving method for the wireless reception of data modulated on a carrier signal by a receiver circuit including a first group and a second group of circuit elements, wherein the first group of circuit elements, which is provided for recovering the data from the modulated carrier signal, is supplied with electrical energy intermittently between energy-free time intervals of an intermittent operation of the first group of circuit elements, while the second group of circuit elements is supplied uninterruptedly with electrical energy, and wherein amplifier settings associated with reception properties of the receiver circuit are stored during the energy-free time intervals of the intermittent operation of the first group of circuit elements.

2. Method according to claim 1, wherein circuit elements of the second group determine the reception properties as a function of the reception conditions and the last received modulated carrier signal.

3. Method according to claim 2, wherein the intermittent operation is interrupted upon the reception of a start signal, the duration of which exceeds the duration of the respective energy-free time interval in the intermittent operation of the first group of circuit elements, subsequently the circuit elements of the first group are supplied with electrical energy until no further carrier signal is received after a specified waiting time has expired after the reception of the modulated carrier signal.

4. Method according to claim 3, wherein the intermittent operation is resumed after the expiry of the waiting time.

5. Method according to claim 4, wherein the timing of the intermittent operation is determined by a charging and discharging process of an electrical storage element.

6. Method according to claim 5, wherein, for the performance of the intermittent operation, the charge value of the state of charge of the storage element is compared by a comparator with a reference value and the intermittent operation is performed as function of a <-relation or >-relation between the charge value and the reference value.

7. Method according to claim 6, wherein the energy-free time interval of the intermittent operation begins with the discharge of the storage element to below the reference value by means of a discharge current source of a first charging and discharging circuit, and the duration of this energy-free time interval corresponds to the charging period of a subsequent first charging process by a charging current source of a second charging and discharging circuit, whereby this first charging process ends after the expiry of a defined period of time after attaining the reference value.

8. Method according to claim 7, wherein a second charging process by means of a charging current source of the first charging and discharging circuit follows the first charging process, if the modulated carrier signal is received at the end of the first charging process, and in which a discharging process by means of a discharge current source of the second charging and discharging circuit is performed at the end of the modulated carrier signal, until a further modulated carrier signal is received, and as a result of which the second charging process is continued, or until the charge value of the state of charge falls below the reference value and which is followed by the first charging process.

9. Method according to claim 6, wherein the charge value is the charging voltage of the storage element.

10. Method according to claim 5, wherein the storage element is a capacitor.

11. Method according to claim 2, wherein the reception properties comprise at least one of an amplification or a control setting.

12. Method according to claim 1, wherein the amplifier settings comprise at least one of a gain factor or a control set value.

* * * * *

UNITED STATES PATENT AND TRADEMARK OFFICE
CERTIFICATE OF CORRECTION

PATENT NO. : 7,162,214 B2
APPLICATION NO. : 10/053403
DATED : January 9, 2007
INVENTOR(S) : Eichin et al.

It is certified that error appears in the above-identified patent and that said Letters Patent is hereby corrected as shown below:

Column 1,
Line 52, after "and", replace "Via" by --via--;

Column 2,
Line 42, after "particular", insert --.--;

Column 3,
Line 34, after "<-relation", replace "or>-relation" by --or >-relation--;
Line 41, after "preferably the", replace "capacitors" by --capacitor,--;

Column 4,
Line 8, after "FIG.", replace "2;" by --2:--;
Line 11, after "the", replace "shutdown" by --shut-down--;
Line 23, after "signals", replace "SIN" by --$S_{IN}$--;
Line 38, after "signal", replace "$S_{out}$" by --$S_{OUT}$--
Line 49, after "signal", replace "SIN" by --$S_{IN}$--;
Line 51, after "digital-analog-converter", replace "(DAG)" by --(DAC)--;
Line 56, after "reduced", insert --.--;
Line 61, after "signal", replace "SIN" by --$S_{IN}$--;

Column 5,
Line 13, after "source", replace "VS" by --$V_S$--;
Line 60, after "FIG. 3", insert --.--;

Column 6,
Line 3, after "inverting", replace "input.A t-$V_C$" by --input. A t-$V_C$--;
Line 10, before "of", replace "SDout" by --$SD_{out}$--;
        after "t-$SD_{out}$", delete --,--;
Line 39, after "time", replace "to" by --$t_0$--;
Line 42, after "voltage", replace "Vs" by --$V_S$--;
Line 44, after "not", delete "10";
Line 52, after "$D_{out}$", insert --,--;
Line 62, after "source", replace "$Q_1$" by --Q1--;
Line 67, after "time", replace "t3" by --$t_3$--;

UNITED STATES PATENT AND TRADEMARK OFFICE
CERTIFICATE OF CORRECTION

PATENT NO. : 7,162,214 B2
APPLICATION NO. : 10/053403
DATED : January 9, 2007
INVENTOR(S) : Eichin et al.

It is certified that error appears in the above-identified patent and that said Letters Patent is hereby corrected as shown below:

<u>Column 7,</u>
Line 12, before "from replace "$Dot_{out}$" by --$D_{out}$--;
Line 18, after "signal", replace "$SD_{pout}$," by --$SD_{out}$,--;
Line 35, after "voltage", replace "Vs" by --$V_S$--;
Line 66, after "or", replace "cut," by --out,--;

<u>Column 8,</u>
Line 3, after "time", replace "$t_{1C}$" by --$t_{10}$--;
Line 8, after "attained", delete --,--;
Line 10, after "$SD_{out}$", delete --,--;
Line 51, after "value", insert --,--.

Signed and Sealed this

Nineteenth Day of June, 2007

JON W. DUDAS
*Director of the United States Patent and Trademark Office*